Jan. 10, 1950 V. F. WIGAL 2,494,273
APPARATUS FOR EXPANDING THERMOPLASTIC TUBING
Filed Jan. 29, 1947
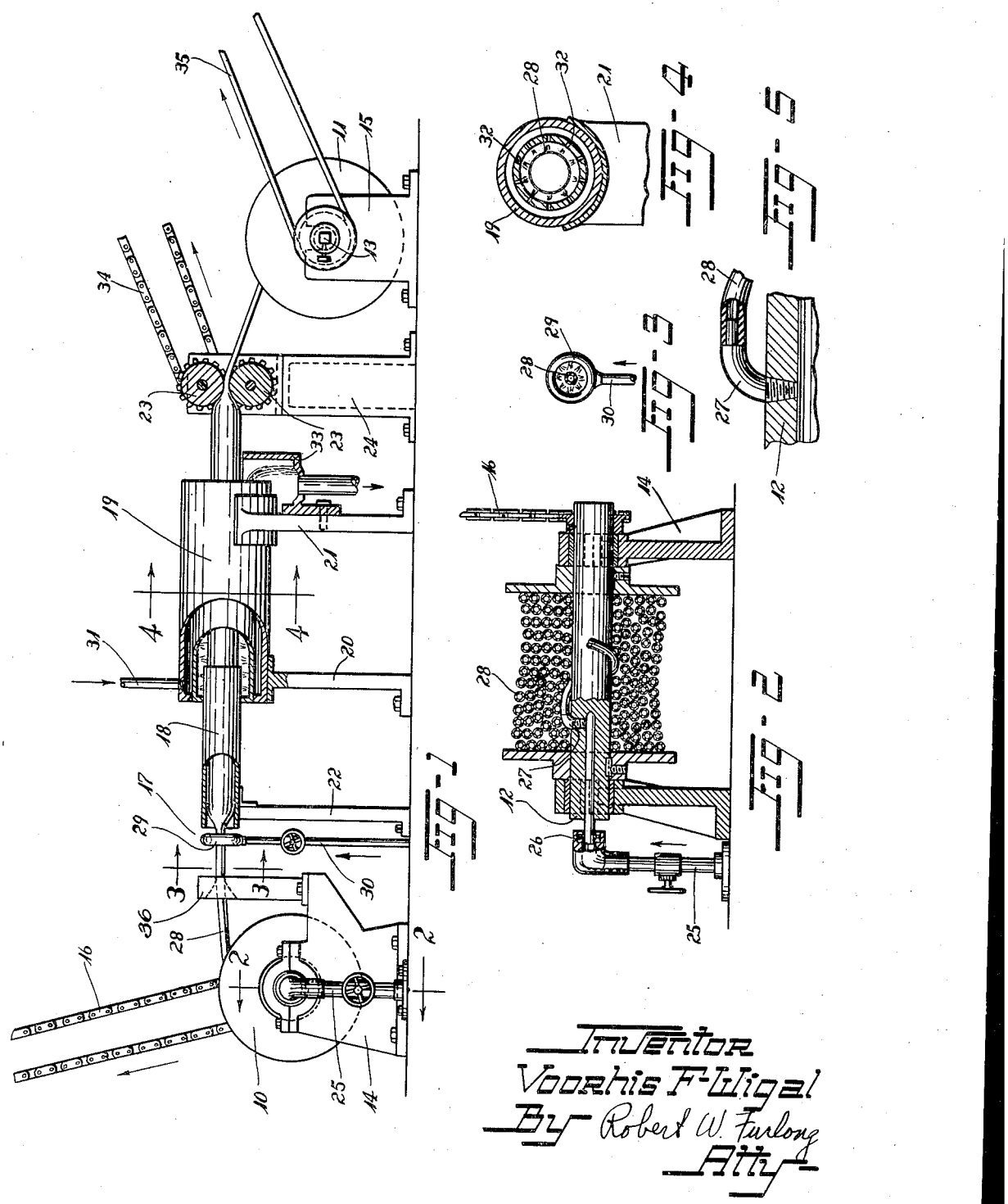

Patented Jan. 10, 1950

2,494,273

UNITED STATES PATENT OFFICE 2,494,273

APPARATUS FOR EXPANDING THERMOPLASTIC TUBING

Voorhis F. Wigal, Cuyahoga Falls, Ohio, assignor to The B. F. Goodrich Company, New York, N. Y., a corporation of New York Application January 29, 1947, Serial No. 725,078

2 Claims. (Cl. 18—19)

This invention relates to apparatus of expanding thermoplastic tubing and particularly to apparatus of expanding thermoplastic tubing to a metastable heat-shrinkable condition.

Such thermoplastic tubing as that made from plasticized polyvinyl chloride or similar materials may be stretched in a softened condition and when hardened in a stretched condition retains a high degree of residual shrinkage. This stretched material may later be shrunk down to the desired size by softening it again.

By means of this invention, apparatus is provided for expanding thermoplastic tubing to a heat-shrinkable condition. The expanded tubing so produced may be readily placed around an article such as a bottle neck or a length of pipe and then shrunk down to a close fitting condition about the article. This invention provides simple apparatus for continuously expanding such tubing into a condition retaining high residual shrinkage and thereafter bringing the tubing into a flattened condition for storage and shipping.

More specifically, the invention comprises apparatus for heating a tube of thermoplastic material to a temperature above its softening point while maintaining fluid pressure inside the tube whereby the tube is expanded beyond original normal size. Means are provided to limit the expansion of the tube and to chill the expanded tube so as to set it in an expanded condition.

Of the drawings:

Fig. 1 is a view in elevation of a preferred apparatus for expanding thermoplastic tubing; part thereof being broken away for clarity of illustration.

Fig. 2 is a section taken on line 2—2 of Fig. 1.

Fig. 3 is a section taken on line 3—3 of Fig. 1.

Fig. 4 is a section taken on line 4—4 of Fig. 1, and

Fig. 5 is an enlarged fragmentary view of the means for introducing compressed air into the tubing.

A preferred form of apparatus embodying this invention as shown in Fig. 1 comprises a rotatable feed reel 10 and a take-off reel 11, the reels being mounted on shafts 12 and 13 journalled in support housings 14 and 15. The reel 10 and shaft 12 are rotated by a chain and sprocket drive 16 actuated by an external power source (not shown). A heater 17 and forming tube 18 are positioned between reels 10 and 11 and a portion of the forming tube 18 is provided with a cooling jacket 19 which preferably extends beyond the end of the forming tube. The cooling jacket 19 is mounted on cradle supports 20 and 21 and the forming tube 18 is supported at one end by the cooling jacket 19 and at the other end by an upright 22. Paired squeeze rolls 23, 23 are mounted between the cooling jacket 19 and the take-off reel 11 in a support housing 24.

In the preferred embodiment the feed reel 10 is provided with means for maintaining air pressure inside the tubing comprising an inlet line 25 from a source of compressed air (not shown). The inlet line 25 terminates in a lip-seal joint 26 in which the reel shaft 12 rotates. The reel shaft 12 has a hollow core extending from the inlet line 25 to an outlet nipple 27 to which the free end of the thermoplastic tubing 28 is joined (Fig. 5). The pressure is maintained in the tubing by the squeezing action of the paired rolls 23, 23 which effectively block off the expanded end of the tubing. Any source of pressure such as liquid or gas pressure may of course be used.

The annular heating means 17 comprises a hollow ring 29 having a steam inlet 30 joined to a source of steam (not shown), the ring having a series of perforations along the inner surface thereof adapted to direct steam against tubing passing through the ring whereby the tubing is softened sufficiently to be expanded by the air pressure therein (Fig. 3). A funnel guide 36 bolted to housing 14 centers the tubing entering heating means 17.

Hot air or other heated fluid may be employed instead of steam if desired. Any other suitable means for heating a circumferential zone of the tubing to a temperature above its softening point may be employed.

The precise temperature to which the thermoplastic tubing is heated is not critical so long as it is high enough so that the tubing may be readily expanded, i. e., above the softening point of the thermoplastic material. Generally it will not be desirable to heat the tubing to a temperature more than 100° F. above its softening point in order to avoid excessive fluidity of the thermoplastic, or decomposition or charring thereof.

The forming tube 18 which is positioned adjacent the heating means 17 is adapted to confine the expanded tubing to a desired size and shape until the tubing is cooled below its softening temperature. In the preferred embodiment shown in Fig. 1 this comprises a cylindrical metal tube having a smooth inner surface. If desired, the forming tube may be oval in cross-section or of any other desired shape and may be constructed of any material which does not soften at temperatures below 400° F. and to which a smooth surface may be imparted.

The rearward portion of the forming tube is cooled by an external double-walled tubular jacket 19 concentric with the forming tube and extending a substantial distance beyond the end of the forming tube. This tubular jacket 19 is provided with an inlet 31 connected to a source of cooling water (not shown) and has a plurality of perforations 32, 32 in the inner wall thereof adapted to direct a water spray against a portion of the forming tube and the expanded thermoplastic tubing emerging from the forming tube. The drain 33 is provided to carry off the cooling water.

The squeeze rolls 23, 23 preferably comprise rubber-covered rolls although metal rolls, etc., may also be used. The rolls are rotated by a chain and sprocket drive 34 actuated by a power source (not shown) and are preferably synchronized with the feed and take-off reels to prevent stretching of the tubing while soft. The take-off reel 11 adjacent the squeeze rolls 23, 23 is rotated by a belt drive 35 from a power source (not shown). The method comprises maintaining fluid pressure inside tubing 28 and moving the tubing through the heater 17 whereby the tubing is heated above its softening point. The softened tubing passes into the forming tube 18 adjacent the heater and the internal pressure expands the tubing until it contacts the inner surface of the forming tube. The forming tube confines the softened tubing to a predetermined cross-section and the cooling jacket 19 lowers the temperature of the expanded tubing below its softening point while in the forming tube so that upon emergence therefrom it does not expand further. It is generally desirable to cool the tubing to a temperature below its softening point as rapidly as possible after expansion of the tubing to the desired diameter in order to retain to the fullest extent the condition of metastability which enables the expanded tubing to shrink upon reheating. The expanded and cooled tubing is thereafter flattened by passing between the paired squeeze rolls 23, 23, which also serve to prevent egress of the pressure fluid from the expanded tubing, and wound on a rotating take-off reel 11.

In some cases where the thermoplastic tubing is relatively inflexible at room temperature, it is desirable to warm the tubing slightly before unrolling and rolling on the reels. If the tubing flows to a marked degree upon reaching its softening point, it is desirable to arrange the apparatus so that the thermoplastic tubing is in a vertical position while passing through the forming tube to prevent buckling and distortion of the tubing.

The apparatus is applicable for expanding tubing of any rackable thermoplastic material among which are such materials as polyvinyl chloride; polystyrene; copolymers of vinyl chloride with vinyl acetate, vinylidene chloride and similar copolymerizable monomers; polyvinylacetals; polyethylene; polymers of acrylic acid or methacrylic esters such as methyl acrylate or methyl methacrylate; rubber hydrochloride; cellulose acetate; ethyl cellulose; superpolyamides and similar thermoplastic materials which may be extruded in the form of tubing. Plasticizers or softeners may of course be employed in the composition when desirable.

The invention is particularly applicable to materials such as plasticized high molecular weight polyvinyl chloride which may be stretched when soft and hardened by cooling in the stretched condition whereby they achieve a metastable condition retaining a high degree of residual shrinkage. The thermoplastic material may contain the commonly used fillers, reinforcing materials, softeners and plasticizers. Where a relatively hard and inflexible tubing is desired, the material may be plasticized with a material having a melting point above the temperatures ordinarily encountered in service, i. e., above about 40° C. Polyvinyl chloride, for example, may be plasticized with a material such as dicyclohexylphthalate which exerts a plasticizing action at the softening temperature of the polymer but which leaves the composition relatively hard and inflexible at ordinary temperatures.

Tubing which has been expanded to a heat-shrinkable condition by means of this invention may be used for bottle closures, tubular covering for joining lengths of tubing and similar uses where it is desirable to have a ring which is readily placed around an object and then reduced in diameter to fit closely about the object. Expanded tubing made in accordance with this invention may be shrunk to substantially its original unexpanded diameter merely by heating it to approximately the same temperature as was employed during the expansion step. A lesser amount of shrinkage may be achieved by heating to a somewhat lower temperature.

Variations and modifications may be effected in the method and apparatus within the scope of the invention as defined in the appended claims.

I claim:

1. Apparatus for expanding preformed hardened thermoplastic tubing to a metastable heat-shrinkable condition, said apparatus comprising a rotatable feed reel for holding a length of preformed hardened thermoplastic tubing, means associated with said feed reel for introducing fluid under pressure into said tubing, a heating means spaced from said feed reel adapted to permit passage of thermoplastic tubing therethrough and to raise the temperature of successive localized circumferential zones of unsoftened tubing passing therethrough above the softening point of the tubing, a generally cylindrical forming tube of substantially uniform cross-section having an inner diameter substantially greater than the outer diameter of the tubing to be expanded positioned contiguous to said heating means, cooling means for a circumferential portion of said forming tube adapted to rapidly cool softened tubing in contact with said forming tube, means for maintaining fluid pressure in tubing during passage through the heating means and forming tube, and means for continuously advancing tubing through said apparatus.

2. Apparatus for making heat-shrinkable thermoplastic tubing, which apparatus comprises in spaced cooperating relation a rotatable feed reel adapted to carry a length of preformed hardened thermoplastic tubing, means associated with said feed reel for introducing compressed air into tubing on said reel, a heating ring spaced from said feed reel adapted to raise the temperature of successive localized circumferential zones of unsoftened tubing passing therethrough above the softening point of the tubing, a generally cylindrical forming tube contiguous to said heating ring of substantially larger inside diameter than the outside diameter of the tubing to be expanded and of generally uniform cross-section throughout its longitudinal extent, cooling means for a circumferential portion of said forming tube adapted to rapidly cool softened tubing in contact with said forming tube, paired squeeze rolls adapted to flatten tubing upon emergence from said forming tube, a rotatable take-off reel and driving means therefor.

VOORHIS F. WIGAL.

REFERENCES CITED

The following references are of record in the file of this patent:

UNITED STATES PATENTS

| Number | Name | Date |
| --- | --- | --- |
| 1,612,509 | Henderson | Dec. 28, 1926 |
| 2,047,554 | Fischer | July 14, 1936 |
| 2,168,993 | Joseph | Aug. 8, 1939 |
| 2,401,774 | Riechel | June 11, 1946 |